(12) United States Patent
Li et al.

(10) Patent No.: US 11,387,452 B2
(45) Date of Patent: Jul. 12, 2022

(54) LINEAR POROUS LITHIUM TITANATE MATERIAL, PREPARATION AND PRODUCT THEREOF

(71) Applicant: PetroChina Company Limited, Beijing (CN)

(72) Inventors: Jianming Li, Beijing (CN); Xu Jin, Beijing (CN); He Liu, Beijing (CN); Xiaoqi Wang, Beijing (CN); Xiaodan Liu, Beijing (CN); Hang Jiao, Beijing (CN)

(73) Assignee: PetroChina Company Limited, Beijing (CN)

( * ) Notice: Subject to any disclaimer, the term of this patent is extended or adjusted under 35 U.S.C. 154(b) by 325 days.

(21) Appl. No.: 16/556,449

(22) Filed: Aug. 30, 2019

(65) Prior Publication Data
US 2020/0075944 A1    Mar. 5, 2020

(30) Foreign Application Priority Data
Sep. 3, 2018 (CN) .......................... 201811018059.8

(51) Int. Cl.
*C01G 23/00* (2006.01)
*H01M 4/485* (2010.01)
(Continued)

(52) U.S. Cl.
CPC .......... *H01M 4/485* (2013.01); *C01G 23/005* (2013.01); *H01M 10/0525* (2013.01); *C01P 2004/16* (2013.01); *H01M 2004/021* (2013.01)

(58) Field of Classification Search
None
See application file for complete search history.

(56) References Cited

U.S. PATENT DOCUMENTS

2012/0070744 A1    3/2012   Moriyama et al.

FOREIGN PATENT DOCUMENTS

| CN | 1725530 A | 1/2006 |
|---|---|---|
| CN | 101486488 A | 7/2009 |
| | (Continued) | |

OTHER PUBLICATIONS

Jinyoung Kim and Jaephil Cho, Spinel Li4Ti5O12 nanowires for high-rate Li-ion intercalation electrode, Jan. 2007, Electrochemical and Solid-State Letters, 10 (3), pp. A81-A84. (Year: 2007).*

(Continued)

*Primary Examiner* — Jonathan Crepeau
*Assistant Examiner* — Angela J Martin
(74) *Attorney, Agent, or Firm* — Hamilton, Brook, Smith & Reynolds, P.C.

(57) ABSTRACT

The present invention provides a linear porous lithium titanate material, preparation and product thereof. The material comprises a lithium titanate material having a crystal phase which is a spinel type, wherein the lithium titanate material has a linear structure having an aspect ratio of greater than 10, and the linear lithium titanate material has a porous structure; wherein the linear porous lithium titanate material has a structure composed of a plurality of particles having an oriented growth direction. The material has a long-axis structure which facilitates the effective migration of electrons, a porous structure which facilitates the rapid intercalation and deintercalation process of lithium ions, sodium ions or potassium ions, and a large specific surface area which facilitates the contact area between the electrolyte solution and the electrodes and reduces the current density, thus is excellent in a rapid charge-discharge performance of the battery.

20 Claims, 8 Drawing Sheets

(51) Int. Cl.
　　　*H01M 10/0525*　　(2010.01)
　　　*H01M 4/02*　　　 (2006.01)

(56)　　　　　References Cited

FOREIGN PATENT DOCUMENTS

| | | |
|---|---|---|
| CN | 102044662 A | 5/2011 |
| CN | 104201364 A | 12/2014 |
| CN | 104261465 A | 1/2015 |
| CN | 104319383 A | 1/2015 |
| CN | 106410146 A | 2/2015 |
| CN | 107959011 A | 4/2018 |
| JP | 2005-281050 | * 10/2005 ............. B01D 53/14 |

OTHER PUBLICATIONS

European Search Report for EP Application No. 19 19 4886, A linear porous lithium titanate material, preparation and product thereof dated Nov. 21, 2019.

Jiang, Y-M., et al., "Hierarchical Li4Ti5O12TiO2 composits tubes with regular structural imperfection for lithium ion storage, Scientific Reports" Dec. 12, 2013, 5 pages.

Kim, J., et al., "Spinel Li4Ti5O12 Nanowires for High-Rate Li-Ion Intercalation Electrode", Electrochemical and Solid-State Letters, 10(3) A81-A84 (2007.

\* cited by examiner

LINEAR POROUS LITHIUM TITANATE MATERIAL, PREPARATION AND PRODUCT THEREOF

RELATED APPLICATION

This application claims priority under 35 U.S.C. § 119 or 365 to Chinese Patent Application No. 201811018059.8, filed on Sep. 3, 2018, which is hereby incorporated by reference in its entirety.

TECHNICAL FIELD

The present invention relates to a technical field of energy, and preparation of eco-friendly materials, in particular, to a linear porous lithium titanate material, preparation and product thereof.

BACKGROUND

As an ideal and promising negative electrode material for lithium-ion batteries, lithium titanate may have a charge-discharge cycle number up to several thousands of times, and thus become a hot spot in the field of electrode materials.

The use of lithium titanate in lithium-ion batteries may be influenced largely by its size and morphology. Compared with particulate lithium titanate, the lithium titanate material having a linear structure can reduce the grain boundary between the particles and facilitate the transport of carriers in the long axis direction, while the long axis may facilitate the effective migration of electrons and the short axis may facilitate the rapid intercalation and deintercalation of lithium, sodium or potassium ions, in the field of electrode materials for batteries. The linear structure has better charge-discharge performance and the like than the particulates. In addition, the porous-structure material has a large specific surface area and a high porosity, providing it many excellent properties in many applications. Lithium titanates prepared to have a porous structure have the following advantages: (1) the porous structure can increase the specific surface area of the material, enlarge the contact area between the electrode and the electrolyte solution, reduce the current density and improve the charge-discharge rate; (2) the porous structure can facilitate the transport of the electrolyte solution, and improve the conductivity; and (3) the material composed of the porous structure, as a whole, pertains to large particles, which facilitates to increase the tap density of the material and improve the capacity per volume of the battery. Therefore, the combination of linear structure, single-crystal structure and porous structure together may obtain a lithium titanate material having a linear, porous and single-crystal structure, which can greatly improve the specific surface area of the material, enhance the surface activity of the material, reduce grain boundaries between the particles and improve the effective transport of carriers in the long axis direction, which can greatly improve the application performance of the material in a battery electrode in terms of capacity and rapid charge-discharge.

The prior methods for producing lithium titanate mainly include solid state synthesis and hydrothermal reaction preparation. Among them, the solid state synthesis method generally includes, firstly mixing well raw materials such as lithium hydroxide or lithium carbonate and titanium dioxide by means of ball milling or in an organic solvent, and then sintering the resultant at a high temperature of more than 800° C. to obtain lithium titanates. The preparation method requires an excess of lithium hydroxide or lithium carbonate, and may produce lithium titanates which have generally a low purity, a size of micrometer scale, and poor morphology and uniformity. The hydrothermal preparation method for lithium titanate usually involves: producing sodium titanate by a hydrothermal process by using commercial titanium dioxide and sodium hydroxide as starting materials, and immersing sodium titanate into an acid solution to obtain a titanic acid by ion exchange; and then mixing the titanic acid with a lithium hydroxide solution or a lithium titanate precursor before the resultant is annealed at different temperatures to obtain a lithium titanate product. A high temperature and a high pressure are involved in the hydrothermal process in the preparation method, which is dangerous to some extent. Meanwhile, the reaction system has a strong basicity of 10 mol/L, which is highly corrosive at high temperatures. Thus, it has a harsh requirement for hydrothermal reaction equipment, and it may be difficult to find a suitable reaction equipment. In addition, the preparation method involves a high alkali concentration, which makes the subsequent product separation and purification difficult, and also brings pollution to the environment. Therefore, the hydrothermal preparation method for lithium titanate still encounters many difficulties in the synthesis equipment and subsequent processing, which render it impossible to achieve large-scale production.

To sum up, in order to further improve the application performance of lithium titanate materials in the field of batteries, e.g. lithium-ion batteries, it is urgent to develop a lithium titanate electrode material having a linear, porous and single-crystal structure. In addition, the development for a preparation method for lithium titanate having a simple technological process and easy for large-scale production, especially a preparation method for lithium titanate materials having a linear porous structure, still faces great technical challenges.

SUMMARY

It is an object of the present invention to provide a linear porous lithium titanate material.

Another object of the present invention is to provide a method for preparing the linear porous lithium titanate material.

Still another object of the present invention is to provide an electrode for a gas sensor or an ion battery, prepared by using the linear porous lithium titanate material as a raw material.

In order to achieve the above objects, in one aspect, there is provided a linear porous lithium titanate material, comprising a lithium titanate material having a crystal phase which is a spinel type, wherein the lithium titanate material has a linear structure having an aspect ratio of greater than 10, and the linear lithium titanate material has a porous structure;

wherein the linear porous lithium titanate material has a structure composed of a plurality of particles having an oriented growth direction which is preferably a <001> direction.

In some embodiments according to the present invention, the linear structure has an aspect ratio of 10 to 100.

In some embodiments according to the present invention, the linear porous lithium titanate material has a structure in form of rectangular column or a plurality of rectangular columns, and has flat side faces which are perpendicular to each other.

In some embodiments according to the present invention, the linear porous lithium titanate material has a structure in form of rectangular column or a plurality of rectangular columns, and has flat side faces which are perpendicular to each other, the side faces being {110} crystal planes.

In some embodiments according to the present invention, the spinel-type lithium titanate crystal phase may further comprise one of an anatase-phase titanium dioxide crystal phase and a monoclinic lithium titanate crystal phase.

In some embodiments according to the present invention, the linear porous structure has a diameter ranging from 20 nm to 1 μm and a length ranging from 1 μm to 50 nm.

In some embodiments according to the present invention, the linear structure has a diameter ranging from 50 nm to 500 nm and a length ranging from 5 μm to 20 nm.

In some embodiments according to the present invention, the linear porous structure has pores having a size of 2 nm to 50 nm.

In some embodiments according to the present invention, the linear porous structure has pores having a size of 5 nm to 20 nm.

In another aspect, there is provided a method for preparing the linear porous lithium titanate material, comprising the following steps:

S11 preparing a dispersion containing a titanium peroxide complex;

S12 adding a lithium compound to the dispersion containing the titanium peroxide complex to form a solution;

S13 reacting the solution by heating to obtain a lithium titanate peroxide having a linear structure;

S14 subjecting the lithium titanate peroxide having a linear structure to low-temperature annealing treatment to obtain an amorphous lithium titanate having a linear structure; and S15 subjecting the amorphous lithium titanate having a linear structure to immersion treatment and high-temperature annealing treatment to obtain the linear porous lithium titanate material.

In some embodiments according to the present invention, in step S15, subjecting the amorphous lithium titanate having a linear structure to hydrogen ion exchange to obtain a titanic acid having a linear structure, which is then subjected to lithium ion exchange and heat treatment to obtain the linear porous lithium titanate material.

In some embodiments according to the present invention, the concentration of the titanium peroxide complex in the dispersion containing the titanium peroxide complex is from 0.01 mol/L to 1 mol/L.

In some embodiments according to the present invention, the concentration of the titanium peroxide complex in dispersion containing a titanium peroxide complex is from 0.05 mol/L to 0.5 mol/L.

In some embodiments according to the present invention, the method for preparing a dispersion containing a titanium peroxide complex includes dispersing a titanium source in an aqueous peroxide solution to form a dispersion.

In some embodiments according to the present invention, the titanium source is one or more in combination selected from the group consisting of metallic titanium, titanium ethoxide, titanium propoxide, tetrabutyl titanate, glycol titanium, titanium glyceroxide, titanium sulfate, titanium oxysulfate, titanium tetrachloride, titanium tetrafluoride, ammonium fluorotitanate, titanium nitride, titanium dioxide, hydrated titanic acid, metatitanic acid, and orthotitanic acid.

In some embodiments according to the present invention, the peroxide is one or more in combination selected from the group consisting of hydrogen peroxide, urea peroxide, and peroxyacetic acid.

In some embodiments according to the present invention, the dispersion containing a titanium peroxide complex may be in a form which is selected from a solution, a suspension, and an emulsion.

In some embodiments according to the present invention, the step S11 for preparing a dispersion containing a titanium peroxide complex also involves adding a polymer to the dispersion in an amount of 0.01% to 10% based on the dispersion, which polymer is one selected from the group consisting of chitosan, guar, methyl cellulose, ethyl cellulose, hydroxyethyl cellulose, hydroxypropyl cellulose, hydroxypropyl methyl cellulose, polyvinyl alcohol, polyacrylamide, polyethylene oxide, polyethylene glycol, and polyvinylpyrrolidone, or any combination thereof.

In some embodiments according to the present invention, the polymer is added to the dispersion in an amount of 0.1% to 1% based on the dispersion.

In some embodiments according to the present invention, the added polymer is selected from the group consisting of a polymer solid and an aqueous polymer solution.

In some embodiments according to the present invention, the lithium compound in step S12 is one or more in combination selected from the group consisting of lithium hydroxide, lithium oxide, lithium peroxide, and lithium superoxide.

In some embodiments according to the present invention, the concentration of lithium ions in the solution formed by adding the lithium compound in step S12 is from 0.4 mol/L to 2.0 mol/L.

In some embodiments according to the present invention, the added lithium compound is selected from the group consisting of a solid lithium compound or an aqueous lithium compound solution.

In some embodiments according to the present invention, the heating reaction in step S13 is carried out at a temperature 60° C. to 100° C. for a time period of 0.5 h to 24 h.

In some embodiments according to the present invention, the low-temperature annealing treatment in step S14 is carried out at a temperature of 150° C. to 250° C. for a time period of 1 h to 24 h, and the high-temperature annealing treatment in step S15 is carried out at a temperature of 350° C. to 800° C. for a time period of 1 h to 24 h.

In some embodiments according to the present invention, the immersion treatment in the step S15 is carried out in a manner in which the amorphous lithium titanate having a linear structure is added to water for an immersion, and then is removed and dried, wherein the ratio by mass of the amorphous lithium titanate having a linear structure to water is 1:1000 to 1:100,000 and the immersion treatment is carried out for a time period of 1 h to 24 h.

In some embodiments according to the present invention, the hydrogen ion exchange process in step S15 involves subjecting the amorphous lithium titanate having a linear structure to multiple washing and separation operations before placing it into an acid solution for hydrogen ion exchange to obtain a titanic acid having a linear structure, wherein the acid solution is one or more selected from the group consisting of nitric acid, hydrochloric acid, sulfuric acid, and acetic acid, and has a concentration of 0.001 mol/L to 0.1 mol/L.

In some embodiments according to the present invention, the lithium ion exchange process in step S15 involving introducing the titanic acid having a linear structure subjected to the hydrogen ion exchange into a solution containing lithium ions for lithium ion exchange to obtain a lithium titanate precursor having a linear structure, wherein the solution containing lithium ions is a solution containing one selected from the group consisting of a lithium nitrate, lithium acetate, lithium chloride, lithium citrate, and lithium hydroxide, or any combination thereof, and has a concentration of lithium ions of 0.1 mol/L to 1.0 mol/L.

In some embodiments according to the present invention, the heat treatment in the step S15 is carried out in a manner which is a hydrothermal reaction and/or a high temperature annealing.

In some embodiments according to the present invention, the hydrothermal reaction involves a system which is one selected from the group consisting of a pure water system, an aqueous system containing lithium ions, and an aqueous system containing lithium hydroxide, and the hydrothermal reaction is carried out at a temperature of 100° C. to 200° C. for a time period of 1 h to 24 h.

In some embodiments according to the present invention, the heat treatment is a high temperature annealing which is carried out at a temperature of 350° C. to 800° C. for a time period of 1 h to 24 h.

In a further aspect, there is also provided a gas sensor or an ion battery electrode, which is prepared by using the linear porous lithium titanate material according to any one of aspects of the present invention as a raw material.

In some embodiments according to the present invention, the ion battery is selected from the group consisting of a lithium ion battery, a sodium ion battery, a potassium ion battery, and a magnesium ion battery.

In summary, the present invention provides a linear porous lithium titanate material, and preparation and product thereof. The material according the invention has the following advantages:

a lithium titanate material having a linear, single-crystal, and porous structure is provided in the present application for the first time;

a preparation technique for a lithium titanate material having a linear, single-crystal, and porous structure is provided by the method, which technique cannot be achieved by other methods;

the porous structure provided by the method can increase the specific surface area of the lithium titanate, increase the contact area with the electrolyte solution when the lithium titanate is used as the electrode material, decrease the current density, and improve the battery performance;

the linear single-crystal structure provided by the method can reduce the grain boundary between the particles, facilitate the transport of carriers in the long axis direction, and enhance the application effect of the electrode material;

the method has a preparation process which is simple, easy to control the process parameters, widely available for the raw materials, low in production cost, and easy to apply to a large-scale industrial production; and the material has a long-axis structure which facilitates the effective migration of electrons, a porous structure which facilitates the rapid intercalation and deintercalation process of lithium ions, sodium ions or potassium ions, and a large specific surface area which facilitates the contact area between the electrolyte solution and the electrodes and reduces the current density, thus is excellent in a rapid charge-discharge performance of the battery.

DETAILED DESCRIPTION

Hereinafter, the implementation of the present invention and the beneficial effects thereof are described in detail by way of specific examples, which are intended to provide a better understanding of the essence and characteristics of the present invention, but are not construed to limit the implementable scope of the present invention.

Example 1

Figure 1:
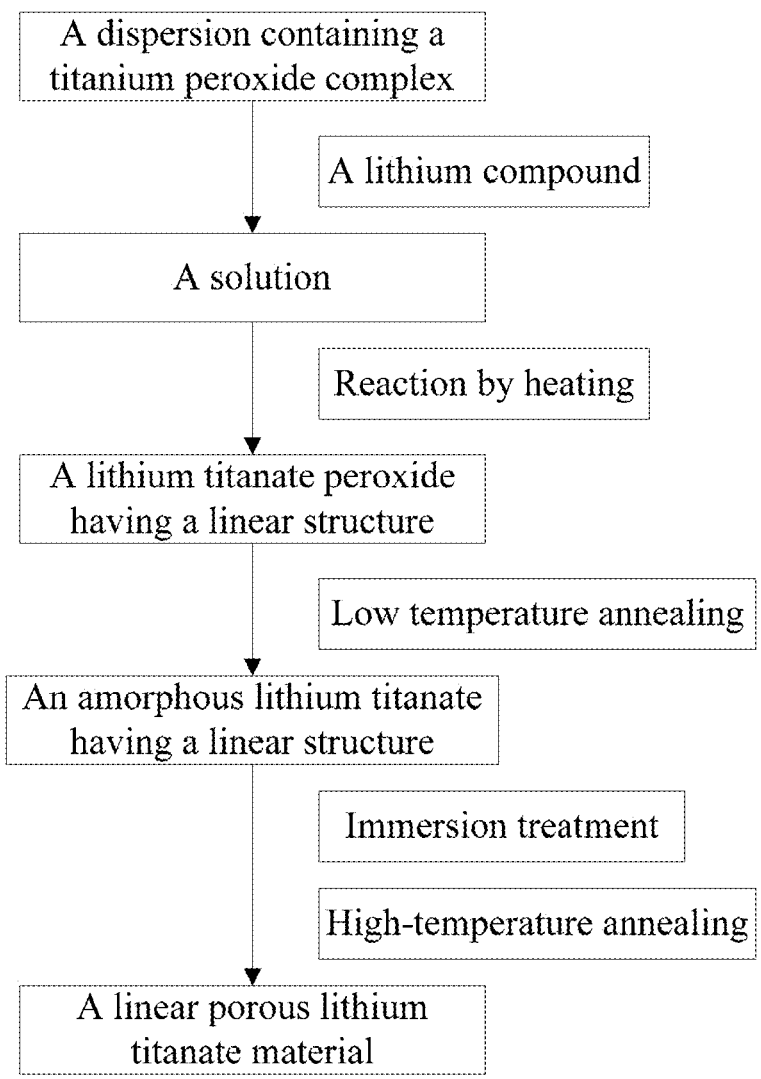
FIG. 1 is a flow chart (A) for the preparation of a linear porous lithium titanate material.

A linear porous lithium titanate material was prepared in accordance with flow chart of FIG. 1. First, 2 g of titanium isopropoxide was dispersed in 100 ml of water, and then 5 ml of 30% hydrogen peroxide was added thereto, followed by stirring to form a suspension containing a titanium peroxide complex. Next, 3.5 g of lithium hydroxide was added to the above peroxide complex-containing suspension, and stirred to form a light-yellow transparent solution. Subsequently, the light-yellow transparent solution was heated to 80° C. and stirred at a constant temperature for 6 hours to obtain lithium titanate peroxide having a linear structure as a white product. The reaction was stopped and the white solid was separated. Subsequently, the above white solid was dried and placed in an oven at 200° C. for an annealing treatment for 20 hours to obtain an amorphous lithium titanate having a linear structure. Next, the amorphous lithium titanate was immersed in water at a mass ratio of 1:10000 as a ratio of the above amorphous lithium titanate to water for 12 hours under stirring, followed by separation and drying. Finally, the above amorphous lithium titanate dried after immersion was heated at 550° C. for 4 hours to obtain a linear porous lithium titanate material.

Figure 2:
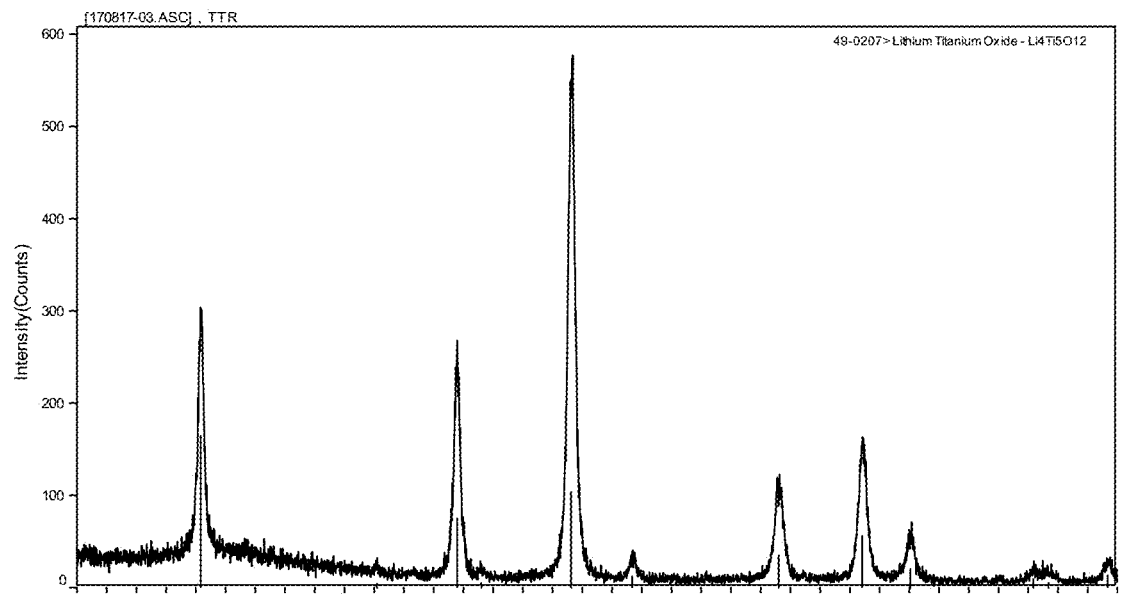
FIG. 2 is an XRD pattern for the lithium titanate material having a spinel crystal phase of Example 1.

The XRD crystal phase spectrum of the linear porous lithium titanate material is shown in FIG. 2, which completely coincides with the standard spinel-type lithium titanate (PDF card No. 49-0207) in its standard peaks. Thus, it is confirmed to be a spinel-type lithium titanate.

Figure 3:
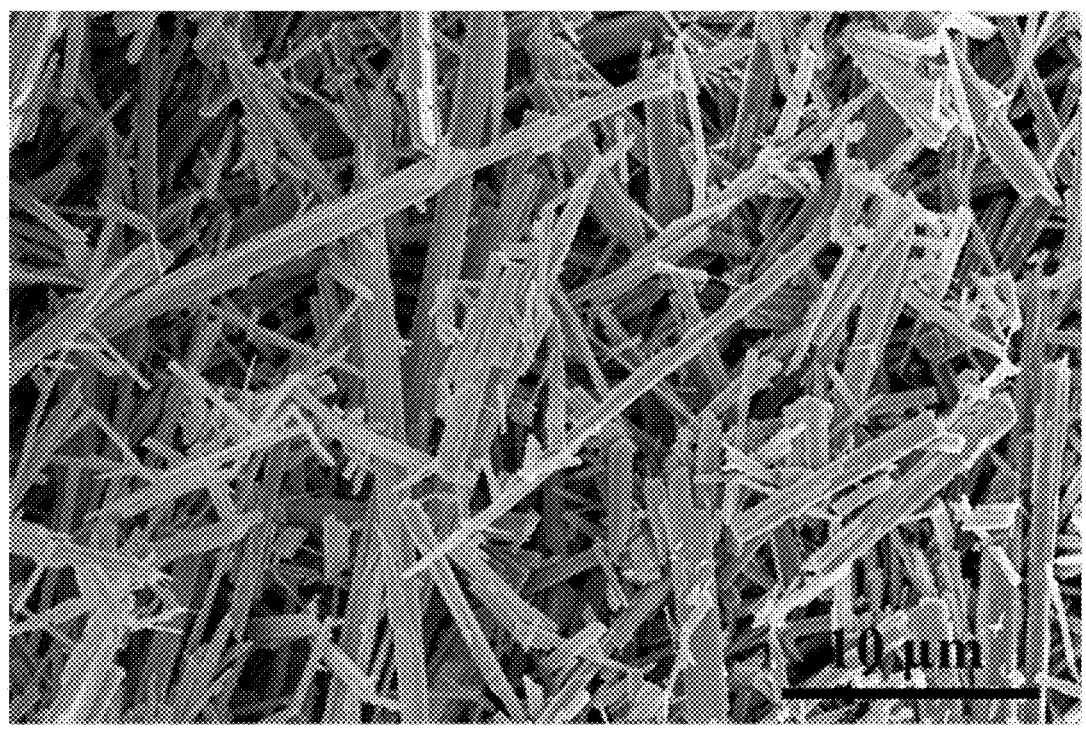
FIG. 3 is an SEM image for the lithium titanate material having a linear structure of Example 1.

The SEM topography image of the linear porous lithium titanate material is shown in FIG. 3. It can be seen that the linear structure has an aspect ratio of greater than 10, and wherein the linear structures with an aspect ratio of 10 to 100 have a proportion up to 80% or more. It can also be seen from the Figure that the linear porous lithium titanate material has a diameter of 20 nm to 1 μm and a length of 1 μm to 50 and wherein the linear structures with a diameter of 50 nm to 500 nm and a length of 5 μm to 20 μm have a proportion up to 60%.

Figure 4:
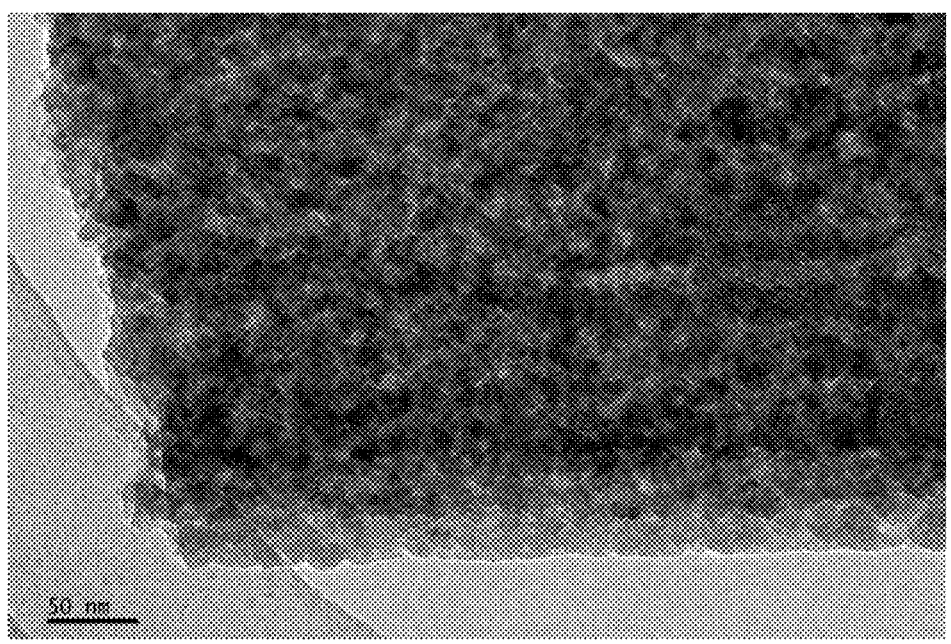
FIG. 4 is a TEM image for the linear lithium titanate material having a porous structure of Example 1.

The TEM topography image of the linear porous lithium titanate material is shown in FIG. 4. It can be seen that the linear lithium titanate material has a porous structure, which has pores having a size of from 2 nm to 50 nm, and wherein the pores having a size of 5 nm to 20 nm have a proportion up to 90% or more.

Figure 5:
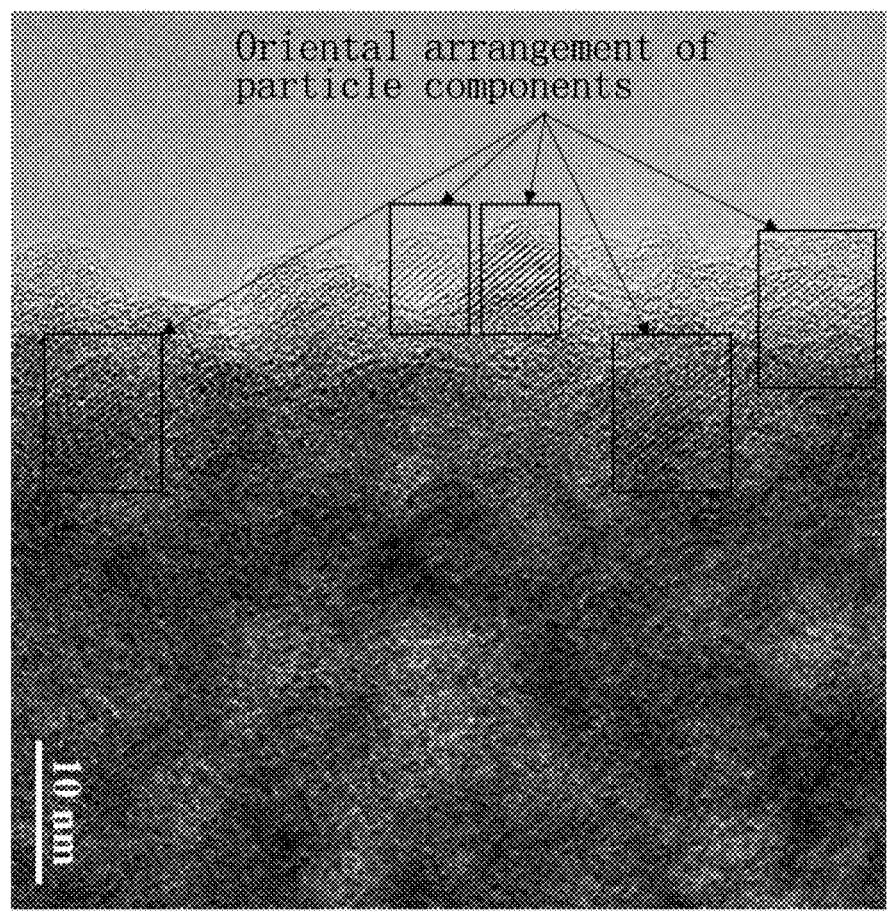
FIG. 5 is a high-resolution (HR) TEM image for the linear porous lithium titanate material of Example 1.

The high-resolution (HR) TEM spectrum of the linear porous lithium titanate material is shown in FIG. 5. It can be seen that the linear porous lithium titanate material has a structure which is composed of a plurality of particles, wherein the particles have an oriented growth direction, that is, the particles grow orientally along a <001> direction.

Figure 6:
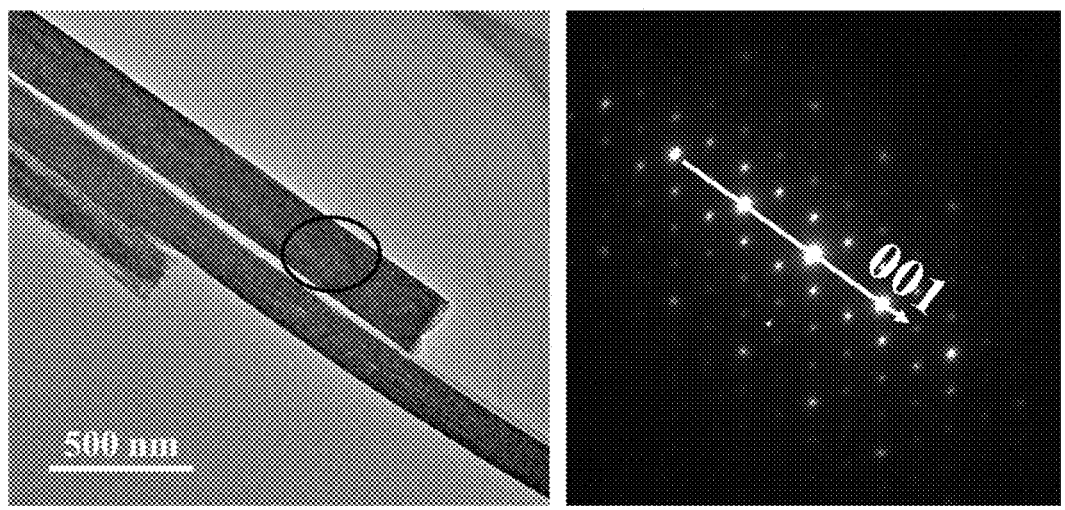
FIG. 6 is a TEM image for the linear porous lithium titanate material of Example 1, and an electron diffraction image for a corresponding selected area (black circle area)

The TEM spectrum of the linear porous lithium titanate material and an electron diffraction image for a corresponding selected area (black circle area) are shown in FIG. 6. It can be seen that the linear porous lithium titanate material has a single-crystal structure as a whole, the single crystal having a long axis orientation of <001> direction.

Figure 7:
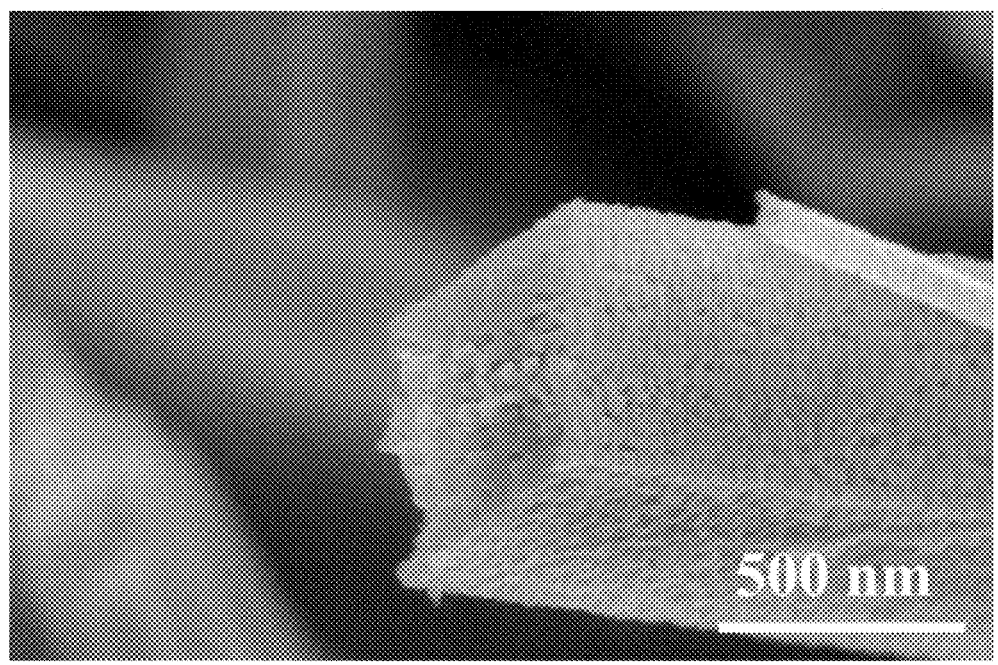
FIG. 7 is a high-resolution SEM topography image for the linear porous single-crystal lithium titanate material of Example 1.
Figure 8:
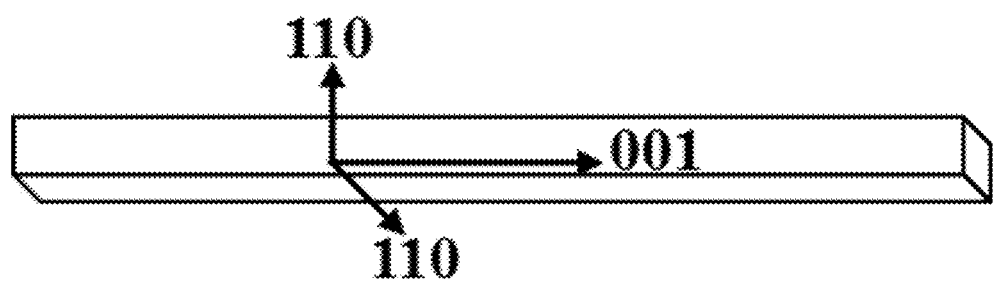
FIG. 8 is a view schematically showing the topography and structure for the linear porous single-crystal lithium titanate material of Example 1.

The high-resolution SEM topography image of the linear porous single-crystal lithium titanate material is shown in FIG. 7. It can be seen that the linear porous single-crystal lithium titanate material has a structure in form of a rectangular column or a plurality of rectangular columns, which has flat side faces perpendicular to each other. The side face of the material is proved to be a {110} crystal plane by combining the results of transmission electron microscopy and an electron diffraction experiment for the selected areas. The schematic diagram for the morphology and structure of the material is shown in FIG. 8.

Figure 9:
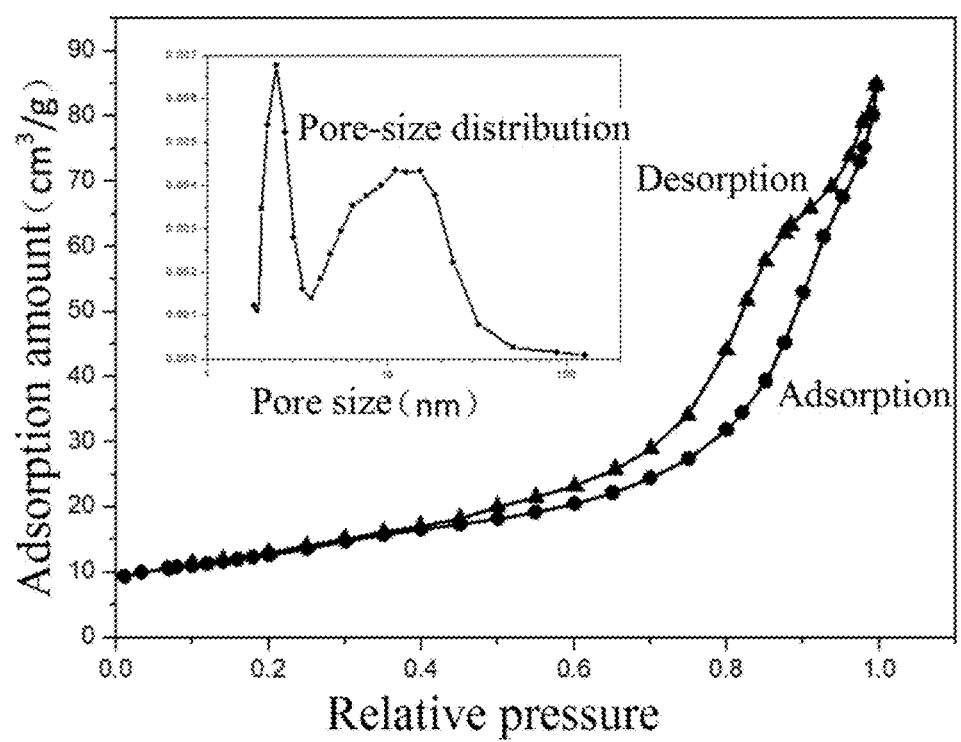
FIG. 9 is a graph showing a BET adsorption-desorption curve and a pore size distribution (inset) for the linear porous single-crystal lithium titanate material of Example 1.

The BET adsorption-desorption curve and the pore size distribution (inset) of the linear porous single-crystal lithium titanate material are shown in FIG. 9. It can be seen that the linear porous single-crystal lithium titanate material has a large specific surface area of 56.6 m$^2$/g and a pore size distribution of 2 nm to 50 nm.

Figure 10:
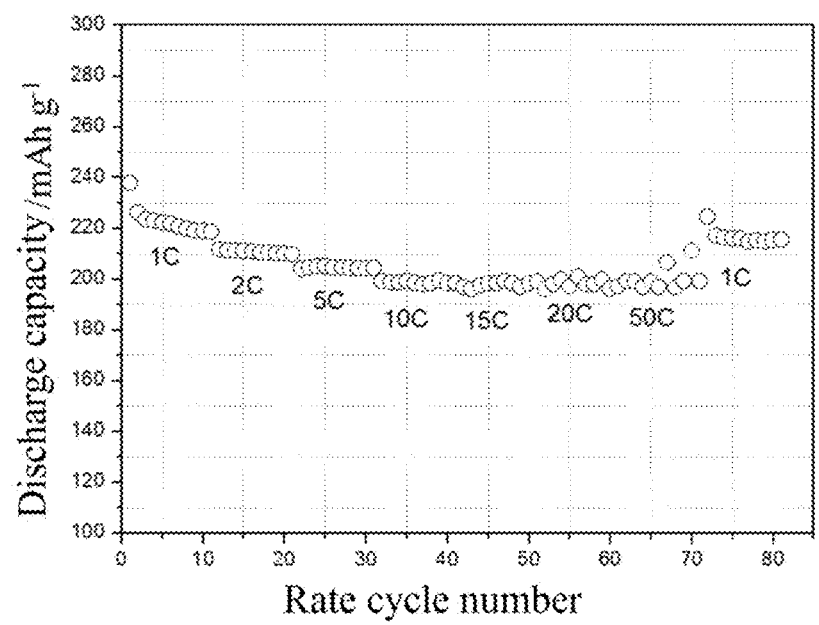
FIG. 10 is a discharge capacity diagram for a lithium ion battery in which the linear porous single-crystal lithium titanate material of Example 1 is used as an electrode material at various charge and discharge rates.

The results for a discharge capacity test of a lithium ion battery having a linear porous single-crystal lithium titanate material as an electrode material at various charge and discharge rates are shown in FIG. 10. The electrode of a lithium ion battery electrode was prepared by a blade coating process, comprises firstly mixing lithium titanate product, super P, and polyvinylidene fluoride (PVDF) in a mass ratio of 7:2:1 into N-methylpyrrolidone (NMP) as a solvent to form a slurry, and then uniformly coating the slurry on a copper foil using a blade coater. Subsequently, in the glove box, a coin battery with a model No. CR2032 was formed by assembling a metallic lithium as a counter electrode, 1 mol/L of LiPF$_6$/EC-DMC-EMC (1:1:1) as an electrolyte solution, a glass fiber as a separator, and used for an electrochemical testing. As can be seen from FIG. 10, since the material has a linear single-crystal porous structure in which the linear long axis and single-crystal characteristics facilitates the effective migration of electrons along long-axis, and the porous structure facilitates rapid intercalation and deintercalation of lithium ions, also increases the specific surface area of lithium titanates, which facilitates the contact area between the electrolyte solution and the electrode, and reduces the current density. Therefore, the material having such a structure allows a lithium ion battery to have an excellent rapid charge-discharge performance, with battery capacities kept at 220, 210, 204, 198, 198, 198 and 198 mAhg$^{-1}$ respectively at various charge and discharge rates of 1C, 2C, 5C, 10C, 15C, 20C and 50C, which is a structural material having the highest capacity among the currently reported lithium titanate materials.

Example 2

A linear porous lithium titanate material was prepared in accordance with flow chart of FIG. 1. First, 0.3 g of titanium sulfate was dispersed in 100 ml of water, and then 2 g of urea peroxide was added thereto, followed by stirring to form a suspension containing a titanium peroxide complex. Next, 1 g of lithium peroxide was added to the above peroxide complex-containing suspension, and stirred to form a light-yellow transparent solution. Subsequently, the light-yellow transparent solution was heated to 60° C. and stirred at a constant temperature for 6 hours to obtain lithium titanate peroxide having a linear structure as a white product. The reaction was stopped and the white solid was separated. Subsequently, the above white solid was dried and placed in an oven at 150° C. for an annealing treatment at a constant temperature for 24 hours to obtain an amorphous lithium titanate having a linear structure. Next, the amorphous lithium titanate was immersed in water at a mass ratio of 1:1000 as a ratio of the above amorphous lithium titanate to water for 24 hours under stirring, followed by separation and drying. Finally, the above amorphous lithium titanate dried after immersion was heated at 350° C. for 24 hours to obtain a linear porous lithium titanate material. The morphology and structure of the obtained linear porous lithium titanate material were similar to those of Example 1. The results for a discharge capacity test of the lithium ion battery prepared by using the linear porous lithium titanate material of the present example as an electrode material at various charge and discharge rates were also similar with those of Example 1.

Example 3

A linear porous lithium titanate material was prepared in accordance with flow chart of FIG. 1. First, 8 g of titanic acid hydrate was dispersed in 80 ml of water, and then 25 ml of 30% hydrogen peroxide was added thereto, followed by stirring to form a suspension containing a titanium peroxide complex. Next, 3 g of lithium oxide was added to the above peroxide complex-containing suspension, and stirred to form a light-yellow transparent solution. Subsequently, the light-yellow transparent solution was heated to 100° C. and stirred at a constant temperature for 1 hours to obtain lithium titanate peroxide having a linear structure as a white product. The reaction was stopped and the white solid was separated. Subsequently, the above white solid was dried and placed in an oven at 250° C. for an annealing treatment at a constant temperature for 2 hours to obtain an amorphous lithium titanate having a linear structure. Next, the amorphous lithium titanate was immersed in water at a mass ratio of 1:100000 as a ratio of the above amorphous lithium titanate to water for 24 hours under stirring, followed by separation and drying. Finally, the above amorphous lithium titanate dried after immersion was heated at 850° C. for 1 hour to obtain a linear porous lithium titanate material. The morphology and structure of the obtained linear porous lithium titanate material were similar to those of Example 1. The results for a discharge capacity test of the lithium ion battery prepared by using the linear porous lithium titanate material of the present example as an electrode material at various charge and discharge rates were also similar with those of Example 1.

Example 4

A linear porous lithium titanate material was prepared in accordance with flow chart of FIG. 1. First, 3 g of titanium oxysulfate hydrate was dispersed in 100 ml of water, and then 5 ml of peracetic acid was added thereto, followed by stirring to form a suspension containing a titanium peroxide complex. Next, 3 g of lithium superoxide was added to the above peroxide complex-containing suspension, and stirred to form a light-yellow transparent solution. Subsequently, the light-yellow transparent solution was heated to 90° C. and stirred at a constant temperature for 3 hours to obtain lithium titanate peroxide having a linear structure as a white product. The reaction was stopped and the white solid was separated. Subsequently, the above white solid was dried and placed in an oven at 180° C. for an annealing treatment at a constant temperature for 15 hours to obtain an amorphous lithium titanate having a linear structure. Next, the amorphous lithium titanate was immersed in water at a mass ratio of 1:50000 as a ratio of the above amorphous lithium titanate to water for 15 hours under stirring, followed by separation and drying. Finally, the above amorphous lithium titanate dried after immersion was heated at 650° C. for 3 hours to obtain a linear porous lithium titanate material. The morphology and structure of the obtained linear porous lithium titanate material were similar to those of Example 1. The results for a discharge capacity test of the lithium ion battery prepared by using the linear porous lithium titanate material of the present example as an electrode material at various charge and discharge rates were also similar with those of Example 1.

Example 5

A linear porous lithium titanate material was prepared in accordance with flow chart of FIG. 1. First, 3 g of tetrabutyl titanate was dispersed in 100 ml of water, and then 6 ml of hydrogen peroxide was added thereto, followed by stirring to form a suspension containing a titanium peroxide complex. Next, 3 g of lithium hydroxide was added to the above peroxide complex-containing suspension, and stirred to form a light-yellow transparent solution. Subsequently, the light-yellow transparent solution was heated to 70° C. and stirred at a constant temperature for 12 hours to obtain lithium titanate peroxide having a linear structure as a white product. The reaction was stopped and the white solid was separated. Subsequently, the above white solid was dried and placed in an oven at 220° C. for an annealing treatment at a constant temperature for 10 hours to obtain an amorphous lithium titanate having a linear structure. Next, the amorphous lithium titanate was immersed in water at a mass ratio of 1:5000 as a ratio of the above amorphous lithium titanate to water for 12 hours under stirring, followed by separation and drying. Finally, the above amorphous lithium titanate dried after immersion was heated at 450° C. for 6 hours to obtain a linear porous lithium titanate material. The morphology and structure of the obtained linear porous lithium titanate material were similar to those of Example 1. The results for a discharge capacity test of the lithium ion battery prepared by using the linear porous lithium titanate material of the present example as an electrode material at various charge and discharge rates were also similar with those of Example 1.

Example 6

A linear porous lithium titanate material was prepared in accordance with flow chart of FIG. 1. First, 3 g of tetrabutyl titanate was dispersed in 100 ml of an aqueous solution containing 0.1% hydroxypropylmethyl cellulose, and then 6 ml of hydrogen peroxide was added thereto, followed by stirring to form a suspension containing a titanium peroxide complex. Next, 3 g of lithium hydroxide was added to the above peroxide complex-containing suspension, and stirred to form a light-yellow transparent solution. Subsequently, the light-yellow transparent solution was heated to 75° C. and stirred at a constant temperature for 10 hours to obtain lithium titanate peroxide having a linear structure as a white product. The reaction was stopped and the white solid was separated. Subsequently, the above white solid was dried and placed in an oven at 200° C. for an annealing treatment at a constant temperature for 15 hours to obtain an amorphous lithium titanate having a linear structure. Next, the amorphous lithium titanate was immersed in water at a mass ratio of 1:8000 as a ratio of the above amorphous lithium titanate to water for 18 hours under stirring, followed by separation and drying. Finally, the above amorphous lithium titanate dried after immersion was heated at 500° C. for 8 hours to obtain a linear porous lithium titanate material. The morphology and structure of the obtained linear porous lithium titanate material were similar to those of Example 1. The results for a discharge capacity test of the lithium ion battery prepared by using the linear porous lithium titanate material of the present example as an electrode material at various charge and discharge rates were also similar with those of Example 1.

Example 7

A linear porous lithium titanate material was prepared in accordance with flow chart of FIG. 1. First, 2 g of titanium isopropoxide was dispersed in 100 ml of an aqueous solution containing 0.5% polyvinyl alcohol, and then 5 ml of hydrogen peroxide was added thereto, followed by stirring to form a suspension containing a titanium peroxide complex. Next, 3.5 g of lithium hydroxide was added to the above peroxide complex-containing suspension, and stirred to form a light-yellow transparent solution. Subsequently, the light-yellow transparent solution was heated to 85° C. and stirred at a constant temperature for 6 hours to obtain lithium titanate peroxide having a linear structure as a white product. The reaction was stopped and the white solid was separated. Subsequently, the above white solid was dried and placed in an oven at 240° C. for an annealing treatment at a constant temperature for 10 hours to obtain an amorphous lithium titanate having a linear structure. Next, the amorphous lithium titanate was immersed in water at a mass ratio of 1:80000 as a ratio of the above amorphous lithium titanate to water for 10 hours under stirring, followed by separation and drying. Finally, the above amorphous lithium titanate dried after immersion was heated at 600° C. for 6 hours to obtain a linear porous lithium titanate material. The morphology and structure of the obtained linear porous lithium titanate material were similar to those of Example 1. The results for a discharge capacity test of the lithium ion battery prepared by using the linear porous lithium titanate material of the present example as an electrode material at various charge and discharge rates were also similar with those of Example 1.

Example 8

Figure 11:
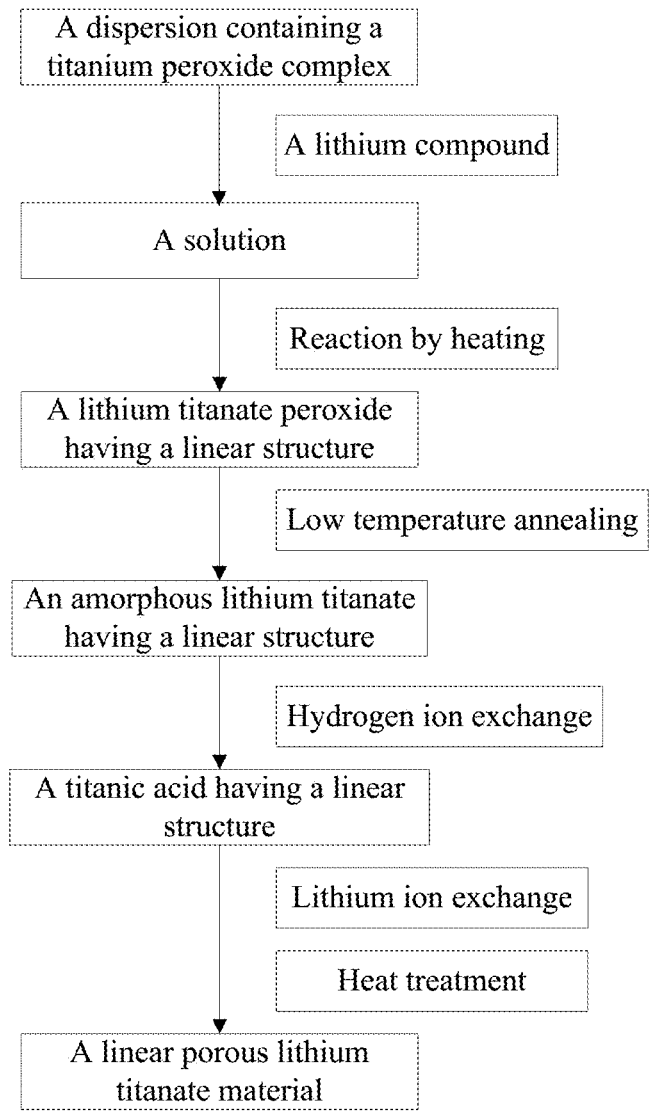
FIG. 11 is a flow chart (B) for the preparation of a linear porous lithium titanate material.

A linear porous lithium titanate material was prepared in accordance with flow chart of FIG. 11. First, 1.5 g of titanium isopropoxide was dispersed in 100 ml of water, and then 4 ml of 30% hydrogen peroxide was added thereto, followed by stirring to form a suspension containing a titanium peroxide complex. Next, 3 g of lithium hydroxide was added to the above peroxide complex-containing suspension, and stirred to form a light-yellow transparent solution. Subsequently, the light-yellow transparent solution was heated to 75° C. and stirred at a constant temperature for 8 hours to obtain lithium titanate peroxide having a linear structure as a white product. The reaction was stopped and the white solid was separated. Subsequently, the above white solid was dried and placed in an oven at 200° C. for an annealing treatment at a constant temperature for 20 hours to obtain an amorphous lithium titanate having a linear structure. Next, the amorphous lithium titanate having a linear structure obtained above is washed with deionized water several times, and then placed in a 0.05 mol/L nitric acid solution for hydrogen ion exchange, thereafter washed with deionized water multiple times until the washing fluid has a pH close to neutral, and then dried to obtain a titanic acid having a linear structure. Next, the above titanic acid having a linear structure was placed in 100 ml of a 0.5 mol/L lithium hydroxide solution for immersion under stirring for 24 hours for lithium ion exchange, followed by separation and drying. Finally, the dried sample was heated at 550° C. for 4 hours to obtain a linear porous lithium titanate material. The morphology and structure of the obtained linear porous lithium titanate material were similar to those of Example 1. The results for a discharge capacity test of the lithium ion battery prepared by using the linear porous lithium titanate material of the present example as an electrode material at various charge and discharge rates were also similar with those of Example 1.

Example 9

A linear porous lithium titanate material was prepared in accordance with flow chart of FIG. 11. First, 0.5 g of titanium sulfate was dispersed in 100 ml of water, and then 2.5 g of urea peroxide was added thereto, followed by stirring to form a suspension containing a titanium peroxide complex. Next, 1.2 g of lithium peroxide was added to the above peroxide complex-containing suspension, and stirred to form a light-yellow transparent solution. Subsequently, the light-yellow transparent solution was heated to 65° C. and stirred at a constant temperature for 20 hours to obtain lithium titanate peroxide having a linear structure as a white product. The reaction was stopped and the white solid was separated. Subsequently, the above white solid was dried and placed in an oven at 160° C. for an annealing treatment at a constant temperature for 24 hours to obtain an amorphous lithium titanate having a linear structure. Next, the amorphous lithium titanate having a linear structure obtained above is washed with deionized water several times, and then placed in a 0.001 mol/L hydrochloric acid solution for hydrogen ion exchange, thereafter washed with deionized water multiple times until the washing fluid has a pH close to neutral, and then dried to obtain a titanic acid having a linear structure. Next, the above titanic acid having a linear structure was placed in 100 ml of a 0.1 mol/L lithium hydroxide solution for immersion under stirring for 24 hours for lithium ion exchange, followed by separation and drying. Finally, the dried sample was heated at 350° C. for 24 hours to obtain a linear porous lithium titanate material. The lithium titanate having a porous structure has a main crystal phase of spinel type and also contains a small amount of anatase-phase titanium dioxide crystal phase. The morphology and structure of the obtained linear porous lithium titanate material were similar to those of Example 1. The results for a discharge capacity test of the lithium ion battery prepared by using the linear porous lithium titanate material of the present example as an electrode material at various charge and discharge rates were also similar with those of Example 1.

Example 10

A linear porous lithium titanate material was prepared in accordance with flow chart of FIG. 11. First, 8 g of titanic acid was dispersed in 80 ml of water, and then 25 ml of 30% hydrogen peroxide was added thereto, followed by stirring to form a suspension containing a titanium peroxide complex. Next, 3 g of lithium oxide was added to the above peroxide complex-containing suspension, and stirred to form a light-yellow transparent solution. Subsequently, the light-yellow transparent solution was heated to 100° C. and stirred at a constant temperature for 2 hours to obtain lithium titanate peroxide having a linear structure as a white product. The reaction was stopped and the white solid was separated. Subsequently, the above white solid was dried and placed in an oven at 250° C. for an annealing treatment at a constant temperature for 4 hours to obtain an amorphous lithium titanate having a linear structure. Next, the amorphous lithium titanate having a linear structure obtained above is washed with deionized water several times, and then placed in a 0.1 mol/L acetic acid solution for hydrogen ion exchange, thereafter washed with deionized water multiple times until the washing fluid has a pH close to neutral, and then dried to obtain a titanic acid having a linear structure. Next, the above titanic acid having a linear structure was placed in 100 ml of a 1 mol/L lithium chloride solution for immersion under stirring for 24 hours for lithium ion exchange, followed by separation and drying. Finally, the dried sample was heated at 850° C. for 2 hours to obtain a linear porous lithium titanate material. The lithium titanate having a porous structure has a main crystal phase of spinel type and also contains a small amount of monoclinic titanium dioxide crystal phase. The morphology and structure of the obtained linear porous lithium titanate material were similar to those of Example 1. The results for a discharge capacity test of the lithium ion battery prepared by using the linear porous lithium titanate material of the present example as an electrode material at various charge and discharge rates were also similar with those of Example 1.

Example 11

A linear porous lithium titanate material was prepared in accordance with flow chart of FIG. 11. First, 2.5 g of titanium isopropoxide was dispersed in 100 ml of an aqueous solution containing 0.8% polyvinyl alcohol, and then 6 ml of hydrogen peroxide was added thereto, followed by stirring to form a suspension containing a titanium peroxide complex. Next, 4 g of lithium hydroxide was added to the above peroxide complex-containing suspension, and stirred to form a light-yellow transparent solution. Subsequently, the light-yellow transparent solution was heated to 80° C. and stirred at a constant temperature for 8 hours to obtain lithium titanate peroxide having a linear structure as a white product. The reaction was stopped and the white solid was separated. Subsequently, the above white solid was dried and placed in an oven at 220° C. for an annealing treatment at a constant temperature for 16 hours to obtain an amorphous lithium titanate having a linear structure. Next, the amorphous lithium titanate having a linear structure obtained above is washed with deionized water several times, and then placed in a 0.01 mol/L sulfuric acid solution for hydrogen ion exchange, thereafter washed with deionized water multiple times until the washing fluid has a pH close to neutral, and then dried to obtain a titanic acid having a linear structure. Next, the above titanic acid having a linear structure was placed in 100 ml of a 0.4 mol/L lithium acetate solution for immersion under stirring for 24 hours for lithium ion exchange, followed by separation and drying. Finally, the dried sample was placed in 50 ml of water and hydrothermally reacted at 150° C. for 12 hours to obtain a linear porous lithium titanate material. The morphology and structure of the obtained linear porous lithium titanate material were similar to those of Example 1. The results for a discharge capacity test of the lithium ion battery prepared by using the linear porous lithium titanate material of the present example as an electrode material at various charge and discharge rates were also similar with those of Example 1.

Example 12

A linear porous lithium titanate material was prepared in accordance with flow chart of FIG. 11. First, 3 g of titanium oxysulfate hydrate was dispersed in 100 ml of water, and then 5 ml of peracetic acid was added thereto, followed by stirring to form a suspension containing a titanium peroxide complex. Next, 3 g of lithium superoxide was added to the above peroxide complex-containing suspension, and stirred to form a light-yellow transparent solution. Subsequently, the light-yellow transparent solution was heated to 90° C. and stirred at a constant temperature for 3 hours to obtain lithium titanate peroxide having a linear structure as a white product. The reaction was stopped and the white solid was separated. Subsequently, the above white solid was dried and placed in an oven at 180° C. for an annealing treatment at a constant temperature for 15 hours to obtain an amorphous lithium titanate having a linear structure. Next, the amorphous lithium titanate having a linear structure obtained above is washed with deionized water several times, and then placed in a 0.02 mol/L acetic acid solution for hydrogen ion exchange, thereafter washed with deionized water multiple times until the washing fluid has a pH close to neutral, and then dried to obtain a titanic acid having a linear structure. Next, the above titanic acid having a linear structure was placed in 100 ml of a 0.6 mol/L lithium nitrate solution for immersion under stirring for 24 hours for lithium ion exchange, followed by separation and drying. Finally, the dried sample was placed in 50 ml of water and hydrothermally reacted at 100° C. for 24 hours to obtain a linear porous lithium titanate material. The morphology and structure of the obtained linear porous lithium titanate material were similar to those of Example 1. The results for a discharge capacity test of the lithium ion battery prepared by using the linear porous lithium titanate material of the present example as an electrode material at various charge and discharge rates were also similar with those of Example 1.

Example 13

A linear porous lithium titanate material was prepared in accordance with flow chart of FIG. 11. First, 2.5 g of tetrabutyl titanate was dispersed in 100 ml of water, and then 5 ml of hydrogen peroxide was added thereto, followed by stirring to form a suspension containing a titanium peroxide complex. Next, 2.8 g of lithium hydroxide was added to the above peroxide complex-containing suspension, and stirred to form a light-yellow transparent solution. Subsequently, the light-yellow transparent solution was heated to 75° C. and stirred at a constant temperature for 10 hours to obtain lithium titanate peroxide having a linear structure as a white product. The reaction was stopped and the white solid was separated. Subsequently, the above white solid was dried and placed in an oven at 200° C. for an annealing treatment at a constant temperature for 16 hours to obtain an amorphous lithium titanate having a linear structure. Next, the amorphous lithium titanate having a linear structure obtained above is washed with deionized water several times, and then placed in a 0.05 mol/L hydrochloric acid solution for hydrogen ion exchange, thereafter washed with deionized water multiple times until the washing fluid has a pH close to neutral, and then dried to obtain a titanic acid having a linear structure. Next, the above titanic acid having a linear structure was placed in 100 ml of a 0.8 mol/L lithium citrate solution for immersion under stirring for 24 hours for lithium ion exchange, followed by separation and drying. Finally, the dried sample was placed in 50 ml of water and hydrothermally reacted at 200° C. for 6 hours to obtain a linear porous lithium titanate material. The morphology and structure of the obtained linear porous lithium titanate material were similar to those of Example 1. The results for a discharge capacity test of the lithium ion battery prepared by using the linear porous lithium titanate material of the present example as an electrode material at various charge and discharge rates were also similar with those of Example 1.

Example 14

A linear porous lithium titanate material was prepared in accordance with flow chart of FIG. 11. First, 2 g of titanium tetrafluoride was dispersed in 100 ml of an aqueous solution containing 0.2% hydroxypropylmethyl cellulose, and then 5 ml of hydrogen peroxide was added thereto, followed by stirring to form a suspension containing a titanium peroxide complex. Next, 3 g of lithium hydroxide was added to the above peroxide complex-containing suspension, and stirred to form a light-yellow transparent solution. Subsequently, the light-yellow transparent solution was heated to 70° C. and stirred at a constant temperature for 12 hours to obtain lithium titanate peroxide having a linear structure as a white product. The reaction was stopped and the white solid was separated. Subsequently, the above white solid was dried and placed in an oven at 200° C. for an annealing treatment at a constant temperature for 15 hours to obtain an amorphous lithium titanate having a linear structure. Next, the amorphous lithium titanate having a linear structure obtained above is washed with deionized water several times, and then placed in a 0.05 mol/L nitric acid solution for hydrogen ion exchange, thereafter washed with deionized water multiple times until the washing fluid has a pH close to neutral, and then dried to obtain a titanic acid having a linear structure. Next, the above titanic acid having a linear structure was placed in 100 ml of a 0.6 mol/L lithium hydroxide solution for immersion under stirring for 24 hours for lithium ion exchange, followed by separation and drying. Next, the dried sample was placed in 50 ml of water and hydrothermally reacted at 120° C. for 1 hour. Finally, the above resultant was separated and dried by heating at 500° C. for 3 hours to obtain a linear porous lithium titanate material. The morphology and structure of the obtained linear porous lithium titanate material were similar to those of Example 1. The results for a discharge capacity test of the lithium ion battery prepared by using the linear porous lithium titanate material of the present example as an electrode material at various charge and discharge rates were also similar with those of Example 1.

What is claimed is:

1. A linear porous lithium titanate material, comprising a lithium titanate material having a crystal phase which is a spinel type,
   wherein the lithium titanate material has a linear structure having an aspect ratio of greater than 10, and the linear lithium titanate material has a porous structure;
   wherein the linear porous lithium titanate material has a structure composed of a plurality of particles having an oriented growth direction which is a <001> direction;
   wherein the linear porous lithium titanate material has a single-crystal structure as a whole, wherein the single crystal has a long axis orientation of <001> direction;
   wherein the linear porous structure has pores having a size of 2 nm to 50 nm.

2. The linear porous lithium titanate material according to claim 1, wherein the linear porous lithium titanate material has a structure in form of rectangular column or a plurality of rectangular columns, and has flat side faces which are perpendicular to each other, the side faces being preferably {110} crystal planes.

3. The linear porous lithium titanate material according to claim 1, wherein the spinel-type lithium titanate crystal phase further comprises one of an anatase-phase titanium dioxide crystal phase and a monoclinic lithium titanate crystal phase.

4. The linear porous lithium titanate material according to claim 1, wherein the linear porous structure has a diameter ranging from 20 nm to 1 μm and a length ranging from 1 μm to 50 μm.

5. A method for preparing the linear porous lithium titanate material according to claim 1, comprising:
   a) preparing a dispersion containing a titanium peroxide complex;
   b) adding a lithium compound to the dispersion containing the titanium peroxide complex to form a solution;
   c) reacting the solution by heating to obtain a lithium titanate peroxide having a linear structure;
   d) subjecting the lithium titanate peroxide having a linear structure to low-temperature annealing treatment to obtain an amorphous lithium titanate having a linear structure; and
   e) subjecting the amorphous lithium titanate having a linear structure to immersion treatment and high-temperature annealing treatment to obtain the linear porous lithium titanate material.

6. The method according to claim 5, wherein, in e), subjecting the amorphous lithium titanate having a linear structure to hydrogen ion exchange to obtain a titanic acid having a linear structure, which is then subjected to lithium ion exchange and heat treatment to obtain the linear porous lithium titanate material.

7. The method according to claim 5, wherein the concentration of the titanium peroxide complex in the dispersion containing the titanium peroxide complex is from 0.01 mol/L to 1 mol/L.

8. The method according to claim 5, wherein the method for preparing a dispersion containing a titanium peroxide complex includes dispersing a titanium source in an aqueous peroxide solution to form a dispersion.

9. The method according to claim 8, wherein the titanium source is one or more in combination selected from metallic titanium, titanium ethoxide, titanium propoxide, tetrabutyl titanate, glycol titanium, titanium glyceroxide, titanium sulfate, titanium oxysulfate, titanium tetrachloride, titanium tetrafluoride, ammonium fluorotitanate, titanium nitride, titanium dioxide, hydrated titanic acid, metatitanic acidor orthotitanic acid; the peroxide is one or more in combination selected from hydrogen peroxide, urea peroxide or peroxyacetic acid.

10. The method according to claim 5, wherein in a) preparing a dispersion containing a titanium peroxide complex also involves adding a polymer to the dispersion in an amount of 0.01% to 10% based on the dispersion, which polymer is one or more in combination selected from chitosan, guar, methyl cellulose, ethyl cellulose, hydroxyethyl cellulose, hydroxypropyl cellulose, hydroxypropyl methyl cellulose, polyvinyl alcohol, polyacrylamide, polyethylene oxide, polyethylene glycol or polyvinylpyrrolidone, and the added polymer is selected from a polymer solid or an aqueous polymer solution.

11. The method according to claim 5, wherein the lithium compound in b) is one or more in combination selected from lithium hydroxide, lithium oxide, lithium peroxide or lithium superoxide.

12. The method according to claim 5, wherein the concentration of lithium ions in the solution formed by adding the lithium compound in b) is from 0.4 mol/L to 2.0 mol/L, and the added lithium compound is selected from a solid lithium compound or an aqueous lithium compound solution.

13. The method according to claim 5, wherein the heating for reaction in c) is carried out at a temperature 60° C. to 100° C. for a time period of 0.5 h to 24 h.

14. The method according to claim 5, wherein the low-temperature annealing treatment in d) is carried out at a temperature of 150° C. to 250° C. for a time period of 1 h to 24 h, and the high-temperature annealing treatment in e) is carried out at a temperature of 350° C. to 800° C. for a time period of 1 h to 24 h.

15. The method according to claim 5, wherein the immersion treatment in e) is carried out in a manner in which the amorphous lithium titanate having a linear structure is added to water for an immersion, and then is removed and dried, wherein the ratio by mass of the amorphous lithium titanate having a linear structure to water is 1:1000 to 1:100,000 and the immersion treatment is carried out for a time period of 1 h to 24 h.

16. The method according to claim 6, wherein the hydrogen ion exchange process in e) involves subjecting the amorphous lithium titanate having a linear structure to multiple washing and separation operations before placing it into an acid solution for hydrogen ion exchange to obtain a titanic acid having a linear structure, wherein the acid solution is one or more selected from nitric acid, hydrochloric acid, sulfuric acid or acetic acid, and has a concentration of 0.001 mol/L to 0.1 mol/L.

17. The method according to claim 6, wherein the lithium ion exchange process in e) involving introducing the titanic acid having a linear structure after the hydrogen ion exchange into a solution containing lithium ions for lithium ion exchange to obtain a lithium titanate precursor having a linear structure, wherein the solution containing lithium ions is a solution containing one or more selected from a lithium nitrate, lithium acetate, lithium chloride, lithium citrate or lithium hydroxide, and has a concentration of lithium ions of 0.1 mol/L to 1.0 mol/L.

18. The method according to claim 6, wherein the heat treatment in the e) is carried out in a manner which is a hydrothermal reaction and/or a high temperature annealing.

19. The method according to claim 6, wherein when the heat treatment is a hydrothermal reaction, the hydrothermal reaction involves a system which is one selected from a pure water system, an aqueous system containing lithium ions or an aqueous system containing lithium hydroxide, and the hydrothermal reaction is carried out at a temperature of 100° C. to 200° C. for a time period of 1 h to 24 h; when the heat treatment is a high temperature annealing, the high temperature annealing is carried out at a temperature of 350° C. to 800° C. for a time period of 1 h to 24 h.

20. An electrode for an ion battery, which is prepared by using the linear porous lithium titanate material according to claim 1 as a raw material.

* * * * *